United States Patent [19]
Clayman

[11] 4,453,408
[45] Jun. 12, 1984

[54] DEVICE FOR TESTING ULTRASONIC BEAM PROFILES

[76] Inventor: William Clayman, 50 Ledgewood Dr., Norwalk, Conn. 06850

[21] Appl. No.: 241,488

[22] Filed: Mar. 9, 1981

[51] Int. Cl.³ .............................................. G01N 29/04
[52] U.S. Cl. ................................................... 73/1 DV
[58] Field of Search ....................... 73/1 DV, 1 R, 644

[56] References Cited

U.S. PATENT DOCUMENTS

| | | | |
|---|---|---|---|
| 3,933,026 | 1/1976 | Ham et al. | 73/1 DV |
| 4,116,040 | 9/1978 | Schoknecht et al. | 73/1 DV |
| 4,286,455 | 1/1981 | Ophir et al. | 73/1 DV |
| 4,331,021 | 5/1982 | Lopez et al. | 73/1 DV |

*Primary Examiner*—Anthony V. Ciarlante
*Attorney, Agent, or Firm*—St. Onge, Steward, Johnston & Reens

[57] ABSTRACT

A device for testing the profile of an ultrasonic beam comprising a block of solid material permitting propagation of said beam therethrough without substantial scattering. A plurality of discrete particles having surfaces interfacing with said solid material are located in and are generally uniformly distributed throughout a substantially planar region in said block. The test device is scanned with an ultrasonic beam and an image of the beam profile is generated by reflection of the beam by the particles.

12 Claims, 7 Drawing Figures

U.S. Patent   Jun. 12, 1984   4,453,408
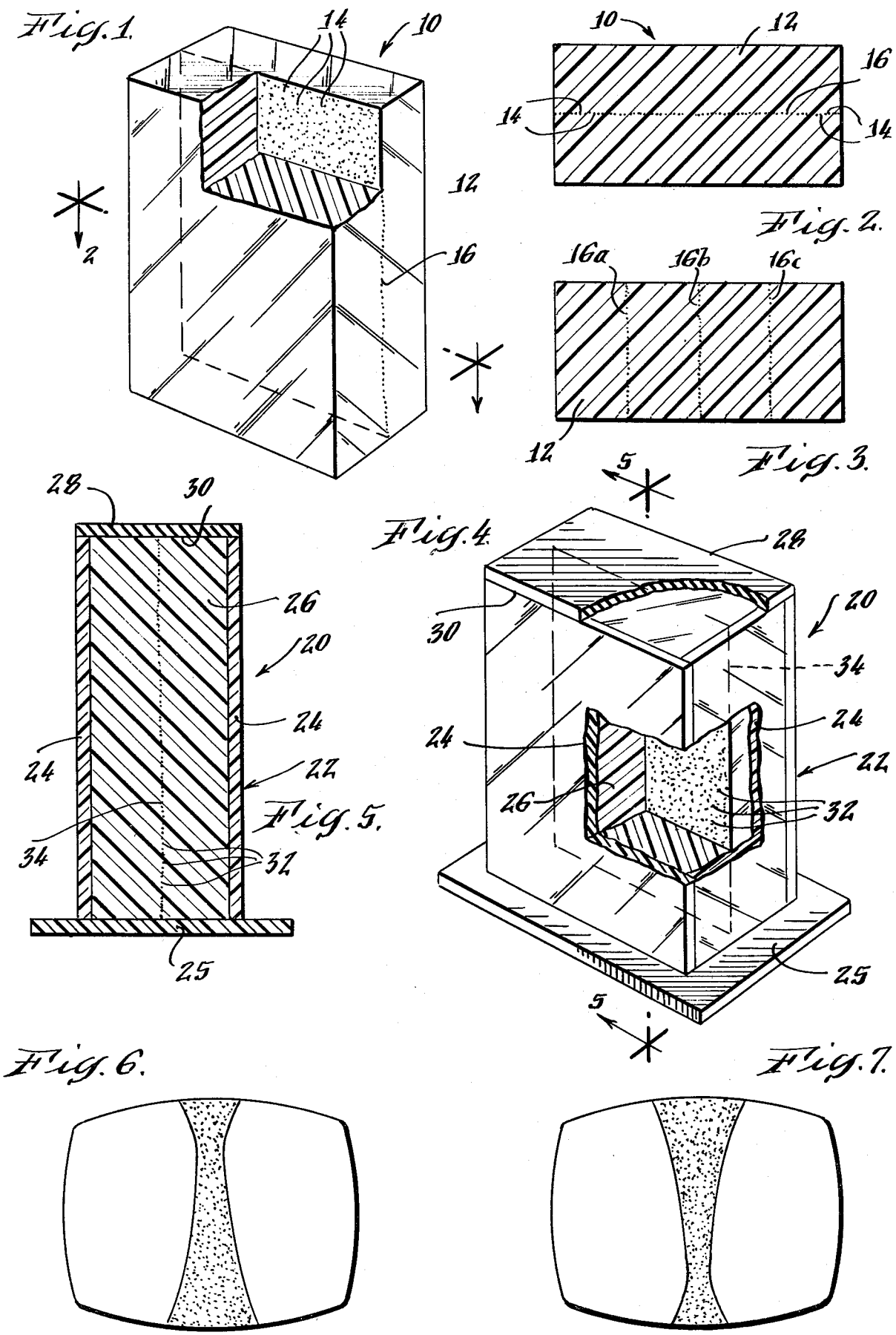

DEVICE FOR TESTING ULTRASONIC BEAM PROFILES

BACKGROUND OF THE INVENTION

(1) Field of the Invention

The present invention relates to devices for testing the profile of ultrasonic beams, and, more specifically, the present invention relates to devices for testing the profile of ultrasonic beams generated by transducers such as those in medical diagnostic instruments.

(2) Description of the Prior Art

An ultrasonic scanner will interchangeably employ transducers or an array of transducers that generate different beam patterns. The transducers typically have different diameters and operate at different frequencies, and therefore generate beams having different patterns. It is important to select a transducer or an array of transducers that generate a beam having a focal zone encompassing the target of interest. For example, a transducer producing a beam having a deep focal zone produces a sharper image of a deep target, for example a target located 12 centimeters from the transducer face, than a transducer producing a beam having a medium depth focal zone.

A device for testing the profile of an ultrasonic beam is disclosed in "Transducer Beam Pattern Test Object", Hafner et al., *J. Clin. Ultrasound* 8:5-10, February, 1980. This test object contains a row of seventeen stainless steel rods fixed in a plane by four plastic braces. The test object is immersed in a tank containing room temperature distilled water. A transducer is passed over the test object in a direction transverse to the plane in which the rods are fixed and a partial image of the transducer beam profile is generated on B-mode hard copy. The row of rods of the test object appears as a row of horizontal lines on the image screen. The length of the lines is an indicator of the lateral resolution, or beam width, at the depths of the rods. This test object has several disadvantages. Water used to fill the tank must be degassed, for example, by allowing it to stand at room temperature for two days prior to use. When the test object is submerged into the degassed water, formation of air bubbles occurs. Although the number of air bubbles may be minimized by slowly submerging the test object and/or by adding detergent to the water, bubble formation is likely to occur causing scattering of the beam. Moreover, since the velocity of sound in room temperature water is lower than the average velocity of ultrasound in soft tissue (1540 m/sec), the depth measurement is inaccurate. The object is cumbersome to manipulate in a clinical environment, as distinguished from a laboratory environment, because water spillage may occur and the object is bulky and heavy.

Another device for testing beam profiles is disclosed in "An Automated Ultrasound Transducer Beam Profiling System", Goodsitt et. al., *Radiology* 132:220-222, July 1979. This device includes an aluminum frame assembly that supports a spherical stainless steel target moveable with respect to the transducer in three degrees of movement. Information about the beam profile is obtained by incrementally moving the target and scanning the target at each target position.

SUMMARY OF THE INVENTION

A device for testing an ultrasonic beam in accordance with the present invention comprises a block of solid material, such as, for example, an elastomer or a gel, that permits propagation of the ultrasonic beam therethrough without substantial scattering. A plurality of discrete particles are located in and are generally uniformly distributed along at least one dimension in the block. The particles have surfaces that interface with the block material. When an ultrasonic beam is directed into the block, the beam is reflected at the particles and block material interface and an image of the beam is generated on an image screen.

In accordance with one aspect of the invention, the particles of the test device are generally uniformly distributed through a substantially planar region having a width and depth sufficient to span the cross-sectional area of a beam directed into the test device. Scattering of the beam at the particle and block material interfaces generates an image delineating the profile of a cross-section of the beam.

In accordance with another aspect of the invention, when the device is used to test transducers intended for use in medical diagnostic equipment, the solid material has a speed of ultrasound therethrough that approximates the speed of ultrasound in animal tissue to minimize errors in determining the depth of the beam profile.

A test device in accordance with the present invention includes a solid block material which may be, for example, an elastomer or a gel, is easily transportable, does not require degassing and avoids formation of air bubbles or other undesirable interfaces that would scatter the beam. Moreover, the particular solid material used may be selected so that the velocity of ultrasound therethrough approximates the velocity of ultrasound through the target that will eventually be scanned. For example, when the transducer is intended for use in medical diagnostic equipment, the material has a velocity of sound therethrough of approximating human tissue, that is, a velocity of about 1540 m/sec. Additional advantages of devices for testing ultrasonic beams in accordance with the present invention will be apparent from the following description of the preferred embodiments with reference to the drawings.

BRIEF DESCRIPTION OF THE DRAWINGS

FIG. 1 is a perspective view of a testing device in accordance with the present invention having a corner broken away to expose discrete particles that reflect an ultrasonic beam directed into the device;

FIG. 2 is a cross-sectional view of the device along the plane 2—2 of FIG. 1;

FIG. 3 is a cross-sectional view of another testing device in accordance with the present invention wherein the device includes a plurality of layers of discrete particles;

FIG. 4 is a perspective view of another testing device in accordance with the present invention having a portion broken away to expose discrete particles that reflect an ultrasonic beam directed into the device;

FIG. 5 is a cross-sectional view of the device along the plane 5—5 of FIG. 4;

FIG. 6 is a front view of an image screen showing the cross-sectional profile of an ultrasonic beam having a relatively shallow focal zone; and FIG. 7 is a front view of an image screen showing the cross-sectional profile of an ultrasonic beam having a relatively deep focal zone.

DESCRIPTION OF THE PREFERRED EMBODIMENT

Referring to FIGS. 1 and 2, a device for testing the profile of an ultrasonic beam is shown. Testing device 10 comprises a block 12 of solid material that permits propagation of an ultrasonic beam therethrough without substantial scattering of the beam. In the embodiment of the device shown in FIGS. 1 and 2, the solid material comprises an elastomer having a rectangular shape. It has been determined that polyol extended urethanes, polyester extended urethanes, polysulfide extended urethanes and polysulfide extended epoxys may be used as the elastomeric material. However, the foregoing elastomers are given by way of example only, and other materials permitting propagation of an ultrasonic beam therethrough without substantial scattering may be used.

As shown in FIGS. 1 and 2, a plurality of discrete particles 14 are located in and are generally uniformly distributed throughout a substantially planar region 16 in block 12. Planar region 16 extends in a pattern having a sufficient depth and width to span the cross-sectional area of an ultrasonic beam intended to be directed into block 12. As shown in the figures, the distribution of particles may extend to the side extremities of the block. The discrete particles 14 have surfaces that interface with solid material 12 to provide reflection of an ultrasonic beam at the interfaces.

The particles are composed of materials that will scatter an ultrasonic beam, and, for example, may be composed of inorganic materials such as sand, silica, graphite and talcum or polymeric materials such as, for example, nylon, polyvinyl chloride or polystyrene or a mixture of two or more of these groups. it should be understood that any discrete means for reflecting the beam may be used and that the foregoing compositions are given by way of example. Although the average diameter of the particles should be selected on the basis of several factors such as the composition of the particles, the composition of the surrounding solid material and the type of target to be scanned by the transducer, it is preferred that the particles have an average diameter between about 0.1 and about 0.25 millimeters.

The test device shown in FIGS. 1 and 2 may be assembled by pouring a first layer of block material and allowing the layer to partially cure. A second relatively thin layer having the particulate material uniformly dispersed therein is then poured on the first layer and is partially cured. A third layer is then poured on the second layer and all three layers are allowed to completely cure to form a block of solid material.

The test device shown in FIGS. 1 and 2 provides a test device that is easy to manipulate, can be stored easily, and can be used at the convenience of the scanner operator without waiting for degassing of the material as is the case when water is the transmission material.

Referring to FIG. 3, a test device having a plurality of layers of discrete particles is shown. The solid material 12 permits propagation of an ultrasonic beam therethrough without substantial scattering of the beam and comprises an elastomer as described with respect to FIGS. 1 and 2. Each of the three layers 16a, 16b and 16c may have different thicknesses and different particle compositions, sizes and densities. For example, layer 16a may have a thickness of 0.25 millimeters and be formed of nylon particles having an average particle size of 0.15 to about 0.18 millimeters and having a density of 2 particles per cubic millimeter, whereas layer 16b may have a thickness of 1.5 millimeters and be formed of polyvinyl chloride particles having an average particle size of 0.2 to about 0.3 millimeters and having a density of 1 particle per cubic millimeter. A person testing a transducer selects one of the layers 16a, 16b or 16c to scan when testing one type of transducer and may select a different layer when testing another type of transducer.

Referring to FIGS. 4 and 5, another embodiment of the test device is shown. Test device 20 comprises a rigid rectangular casing 22 having four side retaining walls 24 and a retaining floor 25 to confine the gel material 26 retained within casing 22. The walls and floor 25 are preferably clear plastic, and most preferably, made from methyl methacrylate sheets assembled with a suitable adhesive. Top wall 28 is preferably made of an elastomer such as polyurethane and is adhered by a suitable adhesive to the top edges of walls 24. The elastomeric top provides for propagation of ultrasound waves therethrough at a velocity approximating that of the gel material 26. The interior surface 30 of top 28 is preferably in direct contact with material 26 to minimize scattering of the beam at the interface between gel material 26 and top 28.

In the embodiment of the test device shown in FIGS. 3 and 4, the material 26 comprises a gel that permits propagation of an ultrasonic beam therethrough without substantial scattering. Examples of gels that may be used are hydrogels and oleogels. Examples of hydrogels that may be used are sodium carboxymethylcellulose gel, agar gels and gelatin. Examples of oleogels are styrenebutadiene copolymer and mineral oil gel; highly plasticized rubber and oil gels; and highly plasticized urethane rubber and oil gels.

As shown in FIGS. 4 and 5, a multitude of discrete particles 32 are located in and are generally uniformly distributed throughout a substantially planar region 34 in said block.

The test device shown in FIGS. 4 and 5 is assembled by pouring a first layer of gel and allowing the gel to partially coagulate. A thin layer of gel containing a uniform distribution of particulates poured on the first gel layer and then another layer of gel is poured to form a block of material.

The preferred embodiment of a device employing a gel as the solid material includes a gel made from about 10 weight percent gelatin in water with an appropriate preservative such as benzalkonium chloride with a velocity therethrough adjusted to about 1540 meters per second with an alcohol such as propanol. The particle layer is preferably about 1 millimeter thick, and formed with polystyrene having an average diameter of about 0.149 to 0.177 millimeters (100 mesh), and having a particle density of 2 particles per cubic millimeter.

When a test device in accordance with any of the three embodiments shown in FIGS. 1 and 2, FIG. 3 or FIGS. 4 and 5, is used to determine profiles of ultrasonic beams intended for use in medical diagnosis, it is preferred that the material from which the block is formed have a velocity of ultrasound therethrough approximating human tissue, that is, a velocity of about 1530 meters per second to about 1550 meters per second. This minimizes errors in depth readings. It should be understood, however, that if the transducers being tested are intended for use in scanning targets other than human tissue, the block material may be selected so that it has a speed of ultrasound therethrough approximating the target to be scanned.

With respect to any of embodiments of the test device shown, it is preferred that the thickness of the particulate layer be less than about 5 millimeters and most preferably between about 0.25 and 2 millimeters. The particulate density in the layer is preferably between about 0.1 to about 100 particles per cubic millimeter.

EXAMPLE 1

Example 1 illustrates the image generated by the test device shown in FIGS. 1 and 2. The elastomeric material from which the block is formed is a polyol extended urethane and the particulate material is polyvinyl chloride having an average particle size of between about 0.2 and about 0.3 millimeters. The thickness of the particulate layer was approximately 2 millimeters and the particulate density in this layer was approximately 1 particles per cubic millimeter. A transducer was attached to a B-mode scanner (PICKER B Scanner, Model 80DL). The image resulting from the scan is shown in FIG. 6.

The image screen shows the cross-sectional profile of the ultrasonic beam and from these images, a user can estimate both the depth and the width of the focal zone. By comparing this image with the images produced by other transducers, one can determine which transducer produces the best lateral resolution at a given distance from the transducer.

EXAMPLE 2

A test device in accordance with the embodiment shown in FIGS. 4 and 5 having a solid gel material was used in this example. An oleogel comprising a mixture of 16.67 weight percent styrene-butadiene copolymer (sold by Shell Oil Co. under the trademark KRATON) and 83.3 weight percent mineral oil was used. The particles used were of nylon material having average particle size between about 0.15 to about 0.18 millimeters. The thickness of the particulate layer was approximately 2 millimeters and the particulate density in this layer was approximately 2 particles per cubic millimeter.

The transducer was connected to a B-mode scanner (PICKER B Scanner, Model 80DL). The image produced by a scanner with the transducer is shown in FIG. 7, which shows a beam having an image wherein the focal zone is located relatively deep.

It should be understood that although specific embodiments of the invention have been described herein in detail, such description is for purposes of illustration only and modifications may be made thereto by those skilled in the art within the scope of the invention.

What is claimed is:

1. A device for testing an ultrasonic beam comprising:
   a block of solid material permitting propagation of said beam therethrough without substantial scattering; and
   a plurality of discrete particles having surfaces interfacing with said material for reflecting said beam, said particles being located in and being generally uniformly distributed along a plane in said block, said plane of particles being surrounded wholly on both sides thereof by said solid material whereby a beam pattern can be tested as it is reflected from said means for reflecting but propagates through said solid material on both sides of said plane without substantial scattering.

2. A test device according to claim 1 wherein said reflecting means comprises particles generally uniformly distributed throughout at least one substantially planar region along a dimension of said block.

3. A test device according to claim 2 wherein said particles are selected from the group consisting of nylon, polyvinyl chloride, polystyrene, sand, silica, graphite, talcum or a mixture of two or more of these groups.

4. A test device according to claim 2 wherein said material comprises a gel selected from a group consisting of hydrogels and oleogels.

5. A test device according to claim 4 wherein said gel is a hydrogel selected from the group consisting of sodium carboxymethylcellulose gel, agar gels and gelatin.

6. A test device according to claim 4 wherein said gel is an oleogel comprising a styrene-butadrene copolymer and mineral oil.

7. A test device according to claim 4 wherein said block of gel is confined in a rigid container having an opening therein, said opening being substantially perpendicular to said planar area, and further including an elastomeric cover for said opening having one side thereof in contact with said gel.

8. A test device according to claim 7 wherein said volume of gel and said container are rectangular.

9. A test object according to claim 2 wherein said solid material comprises an elastomer selected from the group consisting of polyol extended urethanes, polyester extended urethanes, polysulfide extended urethanes and polysulfide extended epoxys.

10. A test device according to claim 9 wherein said elastomer has an ultrasonic velocity therethrough of between about 1530 meters per second and about 1550 meters per second.

11. A test device according to claim 9 wherein said volume of material is a rectangular body and wherein said particles extend in a substantially planar region of said rectangular body.

12. A test device according to claim 2, 4 or 11 wherein the region of particle material has a thickness of between about 0.1 and about 0.25 millimeters and wherein the particle density is between about 0.1 and about 100 particles per cubic millimeter.

* * * * *